May 20, 1958  D. GOLDEN  2,835,867

SIGNAL ATTENUATOR

Filed Nov. 25, 1953

INVENTOR.
DANIEL GOLDEN

BY

ATTORNEY.

United States Patent Office 2,835,867
Patented May 20, 1958

2,835,867

SIGNAL ATTENUATOR

Daniel Golden, Bronx, N. Y., assignor to Underwood Corporation, New York, N. Y., a corporation of Delaware Application November 25, 1953, Serial No. 394,284

4 Claims. (Cl. 323—66)

This invention relates to signal attenuators and more particularly to circuits which attenuate pulse signals whose amplitudes are greater than a relatively low order of magnitude.

Signal attenuators may be used to avoid the results of excessively large signals or to provide signals of magnitudes to which successive circuits can respond. Such attenuators are often required to have non-linear characteristics to attenuate signals of large amplitude proportionately more than those of small amplitude. Thus, for example, non-linear signal attenuators may be used in certain magnetic reading and recording systems to prevent the relatively large recording signals which may enter the reading circuit from temporarily rendering the reading circuit inoperative. A similar problem may also arise in radio receiving equipment when nearby radio transmitting apparatus generates strong signals. The problem is further complicated when balanced circuits are involved in which signals of varying polarity may occur.

Heretofore, many non-linear signal attenuator designs have employed vacuum tubes which are notably susceptible to failure. Furthermore, vacuum tubes possess varying resistance characteristics in the voltage range in which they are normally used so that they are not ordinarily employed without additionally being biased for selectively discriminating against signals of certain orders of magnitude. It is, therefore, generally necessary to supply a bias in vacuum-tube circuits in which it is desired that signals of a certain magnitude remain unattenuated. In addition, circuits which use vacuum tubes are not generally sensitive enough to be utilized as attenuating circuits which are effective in the millivolts range of magnitude.

Other non-linear signal attenuators utilize rectifying devices as means for providing variable impedances to the signals which are to be controlled, but none of these is very effective in the millivolts range.

Accordingly, an object of the invention is to provide circuitry for providing a constant impedance to signals of a relatively low magnitude and a variable impedance to signals of a greater magnitude irrespective of the polarities of the signals.

Another object of the invention is to eliminate the need for a bias source in a signal attenuator which has a constant resistance range.

A further object is to provide a relatively inexpensive pulse attenuator operative in the millivolt range.

A still further object of the invention is to utilize the constant resistance characteristics of crystal diodes, which obtain in the approximate voltage range of from minus to plus ten millivolts, to present a constant impedance to signals of that order of magnitude and to utilize the variable resistance characteristics of crystal diodes to attenuate signals of greater magnitudes.

The invention consists of an inexpensive but effective circuit for attenuating signals whose amplitudes exceed a given order of magnitude. These circuits rely upon a principle which is best illustrated by the constant resistance characteristics of crystal diodes. These characteristics, which are independent of the polarities of the voltages applied to the crystal diodes, enable the circuits employing crystal diodes to provide a substantially constant resistance to applied signals whose amplitudes are within a given range of magnitude. Signals whose amplitudes exceed the range cause the crystal diodes to function as variable impedances and are accordingly attenuated.

Although the constant resistance characteristic of crystal diodes is hereinafter illustrated as existing in the range of from minus to plus ten millivolts, it is to be understood that the range may be extended in accordance with the development of crystal diodes or similar devices whose characteristics are consonant with the principle upon which the invention is based.

Other objects and advantages of the invention will be pointed out in the following description and claims and illustrated in the accompanying drawings which disclose the principle of the invention and the best modes which have been contemplated of applying that principle.

Figure 1:
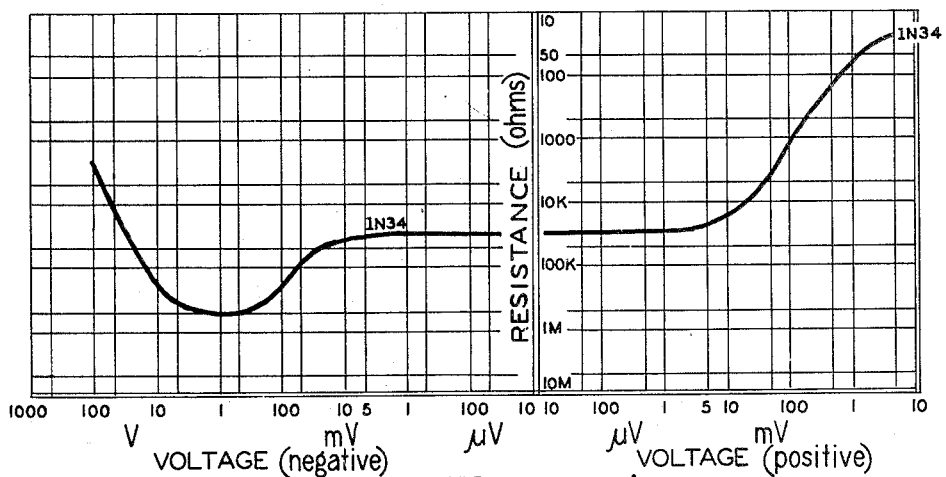
Fig. 1 illustrates a typical resistance characteristic curve of a crystal diode.

Referring to Fig. 1, a logarithmic graph is shown on which the resistance of a 1N34 germanium crystal diode is plotted against the applied voltage. It will be noted that the resistance of the crystal diode is constant over a given range of applied voltage irrespective of the direction in which this voltage is applied to the crystal diode.

More particularly, the resistance of the crystal diode at plus ten millivolts is approximately equal to the resistance at minus ten millivolts. Therefore, it follows that regardless of the polarity of a signal applied to the terminals of the crystal diode the resistance presented to the ignal by the crystal diode will be substantially constant provided that the signal across the diode does not exceed the ten millivolt order of magnitude as shown by the curve in Fig. 1.

The invention employs this characteristic of crystal diodes to present a constant resistance to signals within the given range of magnitudes and a non-linearly varying resistance to signals in excess of such magnitude.

It should be noted that the curve is plotted with respect to logarithmic co-ordinates and that when the signal exceeds the ten millivolt order of magnitude in the negative direction, the resistance of the crystal diode increases at a rate greater than the rate by which the resistance of the crystal diode decreases when the signal exceeds the ten millivolt order of magnitude in the positive direction.

It should also be noted that the curve becomes irregular in the vicinity of minus five volts for the particular crystal diode for which the curve is plotted. Signals in excess of such irregular portions of the curve may be processed by circuits which use other crystal diodes since this portion of the curve is not typical.

Figure 2:
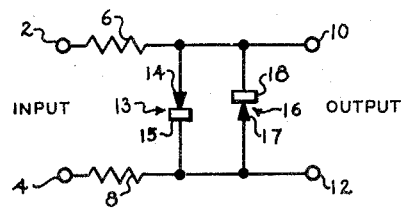
Fig. 2 is a schematic drawing of a signal attenuator in accordance with one embodiment of the invention which may be employed in conjunction with a balanced circuit.

In Fig. 2 an embodiment of the invention is illustrated which may be used as a signal attenuator in conjunction with a balanced circuit.

The terminals 2 and 4 are the input terminals by which a signal is fed to the signal attenuator. The terminals 2 and 4 are respectively coupled by the resistors 6 and 8 to the output terminals 10 and 12. The output terminals 10 and 12 are inter-connected by the oppositely poled crystal diodes 13 and 16.

The crystal diode 13 comprises the anode 14 and the cathode 15. The anode 14 is connected to the output terminal 10 and the cathode 15 is coupled to the output terminal 12. The crystal diode 16 comprises the anode 17 and the cathode 18. The anode 17 is coupled to the output terminal 12 and the cathode 18 is connected to the output terminal 10.

The crystal diodes 13 and 16 may be regarded as parallel impedances which as a unit are in series with the resistors 6 and 8 coupling the terminals 2 and 4.

In accordance with the resistance curve illustrated in Fig. 1, the series circuit consisting of the resistors 6 and 8 and the parallel crystal diodes 13 and 16 is characterized by a total resistance which is constant so long as the signal applied to the crystal diodes 13 and 16 does not exceed the range of magnitudes shown (between minus and plus ten millivolts).

When signals are present at the signal attenuator terminals 2 and 4, current flows between the terminals 2 and 4, and the voltage drop across the crystal diodes 13 and 16 is the voltage which appears at the output terminals 10 and 12. The resistors 6 and 8 account for a certain insertion loss.

When the signals fed to the terminals 2 and 4 cause the voltage across the crystal diodes 13 and 16 to exceed the given order of magnitude, the crystal diodes 13 and 16 commence to operate on the non-linear portions of their resistance curves and effect an attenuation of the applied signals which is non-linearly proportional to the magnitude of such signals.

More particularly, when the signals fed to the terminals 2 and 4 cause the voltage across the crystal diodes 13 and 16 to exceed ten millivolts, the resistance of one of the crystal diodes 13 or 16 decreases (depending upon the polarity of the signal) and the resistance of the remaining crystal diode 13 or 16 increases. Thus the total equivalent resistance between the output terminals 10 and 12 decreases.

It should be noted that the resistance of the crystal diode whose resistance increases varies at a greater rate than does the crystal diode whose resistance decreases. Therefore, the resistance of the crystal diode which decreases controls to a greater extent the value of the resistance which represents the parallel crystal diodes 13 and 16.

Since under these circumstances, the resistances of the resistors 6 and 8 remain constant while the net resistance of the crystal diodes 13 and 16 decreases, the output voltage represents smaller fractions of the input voltage as the input voltage increases.

Thus the output voltage increases in direct proportion to the input voltage until the output voltage is approximately ten millivolts and then tends to "level off" or increase at a lower rate with further increases of input voltage.

A typical value for each of the resistors 6 and 8 of Fig. 2 is ten thousand ohms. Referring to Fig. 1, it will be seen that for voltages under ten millivolts, the resistance of each crystal diode 13 and 16 is about thirty thousand ohms. Therefore, the equivalent resistance of the parallel crystal diodes 13 and 16 is fifteen thousand ohms. This makes the resistance across the terminals 2 and 4 thirty-five thousand ohms (assuming infinite load resistance across the output terminals 10 and 12). The output voltage is therefore about forty-four percent (fifteen thousand divided by thirty-five thousand) of the input voltage. Specifically, for example, an input voltage of seven millivolts results in an output voltage of three millivolts; doubling the input voltage to fourteen millivolts causes the output voltage to double to six millivolts.

As a further example, if the attenuator were linear, an input voltage of only one hundred and forty millivolts would produce a sixty millivolt output. Referring again to Fig. 1, however, it is seen that the resistance of the crystal diode passing current in the forward direction is only four thousand ohms at sixty millivolts; the resistance of the other crystal diode being one hundred thousand ohms. The effective resistance of the two crystal diodes 13 and 16 is then slightly less than four thousand ohms. Therefore the output voltage is only about seventeen percent of the input voltage. As a result, even if the input voltage is increased from fourteen to three hundred and sixty millivolts, an increase of nearly twenty-six times, the output voltage increases only from six to sixty millivolts, an increase of only ten times.

The discrepancy in rate of increase between input and output will be even more pronounced with further increases in input voltage; for example, the output voltage will not reach six tenths of a volt until the input voltage has risen to about one hundred and twenty volts (since the crystal diode has a forward resistance of only about one hundred ohms at six tenths of a volt and thus accounts for only about one two hundredth of the total resistance between the terminals 2 and 4).

Figure 3:
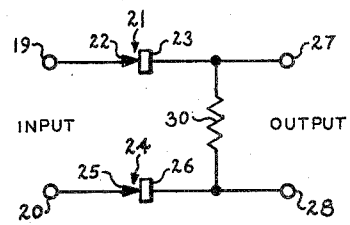
Fig. 3 shows a second embodiment of the invention which may be employed with a balanced circuit.

Referring now to Fig. 3 a signal attenuator is illustrated in accordance with a second embodiment of the invention which is also used in conjunction with a balanced circuit. The terminals 19 and 20 are the input terminals by which signals are received by the signal attenuator. The crystal diodes 21 and 24 respectively couple the terminals 19 and 20 to the output terminals 27 and 28. The output terminals 27 and 28 are coupled together by the resistor 30.

The crystal diode 21 includes the anode 22 and the cathode 23. The anode 22 is connected to the terminal 19 and the cathode 23 is connected to the output terminal 27. The crystal diode 24 which comprises the anode 25 and the cathode 26, is coupled to the terminal 20 via the anode 25 and to the output terminal 28 via the cathode 26. The crystal diodes 21 and 24 and the resistor 30 constitute a series circuit which couples the terminals 19 and 20 together.

As previously noted, when the voltage applied across the crystal diodes 21 and 24 are within the critical voltage range, the crystal diodes 21 and 24 exhibit constant resistance characteristics regardless of the polarity of the applied voltage. Therefore, when signals are applied to the terminals 19 and 20 which cause voltages to be present across the crystal diodes 21 and 24 which are within this critical range, the current drawn through the resistor 30 is directly proportioned to the input voltage. Therefore, the voltage drop across the resistor 30, which appears as the output voltage at the output terminals 27 and 28, is likewise directly proportional to the input voltage.

However, when a signal applied to the terminals 19 and 20 causes the voltages at the crystal diodes 21 and 24 to exceed the critical limit illustrated in the curve in Fig. 1, the resistance of one of the crystal diodes 21 or 24 increases and the resistance of the remaining crystal diode 21 or 24 decreases depending on the polarity of the signal. As was previously noted, the resistance of the crystal diode whose resistance increases varies at a greater rate than the resistance of the crystal diode whose resistance decreases. It, therefore, follows that the total resistance of the crystal diodes 21 and 24 increases when the signal applied to the terminals 19 and 20 causes the voltage at the crystal diodes 21 and 24 to exceed the critical range of voltage amplitudes.

As a result, a greater fraction of the input voltage appears across the diodes 21 and 24, and a correspondingly smaller fraction appears as an output voltage across the resistor 30. Since the crystal diodes are then operating upon the nonlinear portions of their curves, the attenuation increases non-linearly as the magnitude of the signal increases.

Figure 4:
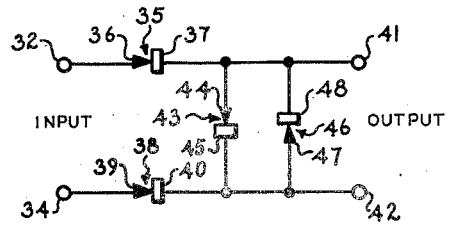
Fig. 4 is a schematic drawing of a third embodiment of the invention which may be employed with a balanced circuit.

Fig. 4 illustrates a third embodiment of the invention which is also intended for use with a balanced circuit. The terminals 32 and 34 are the input terminals by which signals are fed to this version of the signal attenuator. The terminals 32 and 34 are respectively coupled via the crystal diodes 35 and 38 to the output terminals 41 and 42.

The crystal diode 35, which comprises the anode 36 and the cathode 37, is connected respectively via its anode 36 and cathode 37 to the terminal 32 and the output terminal 41. The crystal diode 38, which includes the anode 39 and the cathode 40, is connected respectively via its anode 39 and cathode 40 to the terminal 34 and the output terminal 42.

The output terminals 41 and 42 are coupled together by the crystal diodes 43 and 46. The crystal diode 43 comprises the anode 44 and the cathode 45. The anode 44 is coupled to the output terminal 41 and the cathode 45 is connected to the output terminal 42. The crystal diode 46 includes the anode 47 and the cathode 48. The anode 47 is connected to the output terminal 42 and the cathode 48 is coupled to the output terminal 41.

The circuit illustrated in Fig. 4 operates in a similar manner to the circuits illustrated in Figs. 2 and 3. As long as the signals applied to the terminals 32 and 34 remain within the critical voltage range, the series circuit comprising the crystal diodes 35 and 38 along with the parallel crystal diodes 43 and 46 are characterized by a total resistance which is constant. However, when the signals are such that the voltages across the crystal diodes exceed the range in which the crystal diodes exhibit constant resistance characteristics, the resistance of the crystal diodes 35 and 38 increases, while that of the parallel branch comprising the crystal diodes 43 and 46 decreases. Since the ratio of output voltage to input voltage is the ratio of the resistance of the parallel branch to the total resistance, the output voltage under these conditions will be a smaller fraction of the input voltage than is the case when the circuit is operating in the constant-resistance range of the crystal diodes. As a result of the non-linear resistance characteristic of the crystal diodes, larger magnitude signals are more severely attenuated than the lower magnitude signals. Furthermore, since both series and shunt diodes contribute to the effect, the non-linearity of the circuit of Fig. 4 is more pronounced than that of the circuit of Fig. 2 or Fig. 3.

Figure 5:
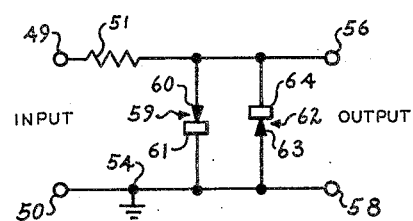
Fig. 5 is a schematic drawing illustrative of how the signal attenuator illustrated in Fig. 2 may be modified for use in conjunction with a single-sided circuit.

Although the three embodiments of the invention which have previously been described are all intended for use with balanced circuits, they may be readily modified so that they will operate effectively with single-sided inputs. For example, a modification of the circuit illustrated in Fig. 2 is shown in Fig. 5 and is intended for use as a single-sided circuit.

The terminals 49 and 50 are the input terminals by which signals are fed to the signal attenuator. The terminal 49 is coupled via the resistor 51 to the output terminal 56. The terminal 50 and the output terminal 58 are common and are grounded as illustrated at the junction 54. The output terminals 56 and 58 are coupled via the oppositely poled crystal diodes 59 and 62. The crystal diode 59 comprises the anode 60 connected to the output terminal 56 and the cathode 61 which is grounded. The crystal diode 62 includes the grounded anode 63 and the cathode 64 which is connected to the output terminal 56.

As long as the potential difference across the crystal diodes 59 and 62 does not exceed the critical voltage range, the crystal diodes 59 and 62 in series with the resistor 51 present a series path from the terminal 49 to ground which path is characterized by a constant total resistance. However, when the potential difference across the crystal diodes 59 and 62 exceeds the critical voltage range irrespective of the polarity of the voltage, the combined resistances of the crystal diodes 59 and 62 reduce the resistance of the shunt path to ground from the terminal 56. This operates to cause a smaller fraction of the total applied input voltage to appear across the output terminals 56 and 58.

Since the resistance between the terminal 56 and ground decreases further as the voltage across the crystal diodes 59 and 62 increases beyond the critical voltage limit, the signals applied to the terminals 49 and 50 are increasingly attenuated as they exceed the critical voltage limit by greater magnitudes.

In the various circuits which have been illustrated it has thus been shown how the described principle may be utilized in a simple unbiased circuit to attenuate signals whose amplitudes exceed a given order of magnitude.

There will be obvious to those skilled in the art many modifications and variations utilizing the principles set forth and realizing many or all of the objects and features of the circuits described but which do not depart essentially from the spirit of the invention.

What is claimed is:

1. A signal attenuator comprising a plurality of input signal terminals, a plurality of corresponding output signal terminals, impedance means coupling said input terminals to said output terminals and said output teminals to each other, and said impedance coupling means including at least a pair of unbiased crystal diodes connected across said output terminals, said diodes being connected in parallel but oppositely poled, each diode having constant resistance characteristics over an applied voltage range in the order of minus ten to plus ten millivolts irrespective of the polarity of the applied voltage and variable resistance characteristics when said range is exceeded, said impedance coupling means using said unbiased crystal diode resistance characteristics to discriminate against negative and positive voltages in excess of said applied voltage range, whereby a constant impedance is presented between input signals of varying polarity within said range and corresponding output signals, while input signals of magnitudes outside said range are attenuated at the output terminals.

2. A signal attenuator comprising first and second input signal terminals, corresponding first and second output signal terminals, a first impedance coupling said first input terminal to said first output terminal, a second impedance coupling said second input terminal to said second output terminal, and a pair of parallel but oppositely poled unbiased crystal diodes coupling said first output to said second output terminal, said unbiased crystal diodes each having constant resistance characteristics over an applied voltage range in the order of minus ten to plus ten millivolts irrespective of the polarity of the applied voltage and variable resistance characteristics when said range is exceeded, said unbiased crystal diode resistance characteristics discriminating against negative and positive voltage in excess of said applied voltage range, whereby a constant impedance is presented between input signals of varying polarity within said range and corresponding output signals, while input signals of magnitudes outside said range are attenuated at the output terminals.

3. A signal attenuator comprising first and second input signal terminals, corresponding first and second output signal terminals, an unbiased crystal diode coupling said first input terminal to said first output terminal, a second unbiased crystal diode coupling said second input terminal to said second output terminal, and a pair of parallel but oppositely poled unbiased crystal diodes coupling said first output to said second output terminal, said unbiased crystal diodes each having constant resistance characteristics over an applied voltage range in the order of minus ten to plus ten millivolts irrespective of the polarity of the applied voltage and variable resistance characteristics when said range is exceeded, said unbiased crystal diode resistance characteristics discriminating against negative and positive voltages in excess of said applied voltage range, whereby a constant impedance is presented between input signals of varying polarity within said range and corresponding output signals, while input signals of magnitudes outside said range are attenuated at the output terminals.

4. A signal attenuator comprising an input signal terminal, an output signal terminal, and at least one grounded terminal, an impedance coupling said input terminal to said output terminal, and a pair of parallel but oppositely poled unbiased crystal diodes coupling said output terminal to said grounded terminal, said unbiased crystal diodes each having constant resistance characteristics over an applied voltage range in the order of minus ten to plus ten millivolts irrespective of the polarity of the applied voltage and variable resistance characteristics when said range is exceeded, said unbiased crystal diode resistance characteristics discriminating against negative and positive voltages in excess of said applied voltage range, whereby a constant impedance is presented between input signals of varying polarity within said range and corresponding output signals, while input signals of magnitudes outside said range are attenuated at the output terminals.

References Cited in the file of this patent

UNITED STATES PATENTS

| | | |
|---|---|---|
| 1,883,613 | Denol | Oct. 18, 1932 |
| 2,122,748 | Mayer | July 5, 1938 |